United States Patent
Lee et al.

(10) Patent No.: US 10,858,006 B2
(45) Date of Patent: Dec. 8, 2020

(54) BACKWARD DRIVING CONTROL METHOD FOR HYBRID VEHICLE

(71) Applicants: Hyundai Motor Company, Seoul (KR); Kia Motors Corporation, Seoul (KR)

(72) Inventors: June Ho Lee, Seoul (KR); Hyeon Jin Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/539,204

(22) Filed: Aug. 13, 2019

(65) Prior Publication Data

US 2020/0307587 A1  Oct. 1, 2020

(30) Foreign Application Priority Data

Mar. 26, 2019 (KR) .................. 10-2019-0034207

(51) Int. Cl.
*B60W 30/18* (2012.01)
*B60W 10/08* (2006.01)
*B60W 10/115* (2012.01)

(52) U.S. Cl.
CPC ...... *B60W 30/18036* (2013.01); *B60W 10/08* (2013.01); *B60W 10/115* (2013.01); *B60W 2510/081* (2013.01); *B60W 2510/083* (2013.01); *B60W 2710/083* (2013.01); *B60W 2710/1077* (2013.01); *B60W 2710/1094* (2013.01)

(58) Field of Classification Search
None
See application file for complete search history.

(56) References Cited

U.S. PATENT DOCUMENTS

| | | | | |
|---|---|---|---|---|
| 2011/0092334 | A1* | 4/2011 | Baino | B60K 6/547 477/5 |
| 2018/0118035 | A1* | 5/2018 | Ozawa | F16D 48/06 |
| 2018/0264970 | A1* | 9/2018 | Lor | B60L 15/20 |
| 2019/0084555 | A1* | 3/2019 | Omuro | B60K 6/365 |

FOREIGN PATENT DOCUMENTS

KR  10-2017-0022219 A  3/2017

* cited by examiner

*Primary Examiner* — Justin Holmes
(74) *Attorney, Agent, or Firm* — Morgan, Lewis & Bockius LLP

(57) ABSTRACT

A backward driving control method for a hybrid vehicle may include a condition determination operation of, when the driver performs a shifting to a reverse gear stage, determining whether the rotation speed of a motor in the forward direction exceeds a reference speed and whether the torque of the motor exceeds a reference torque, a first backward driving operation of, when the rotation speed of the motor exceeds the predetermined reference speed and when the torque of the motor exceeds the predetermined reference torque, implementing the reverse gear stage using a backward driving implementation device of the transmission, a zero-torque control operation of decreasing the torque of the motor to zero, a forward driving conversion operation of shifting the transmission to a forward gear stage, and a second backward driving operation of driving the motor in the reverse direction to implement the reverse gear stage.

4 Claims, 3 Drawing Sheets

BACKWARD DRIVING CONTROL METHOD FOR HYBRID VEHICLE

CROSS-REFERENCE TO RELATED APPLICATION

The present application claims priority to Korean Patent Application No. 10-2019-0034207, filed on Mar. 26, 2019 in the Korean Intellectual Property Office, the entire contents of which is incorporated herein for all purposes by this reference.

BACKGROUND OF THE INVENTION

Field of the Invention

The present invention relates to a backward driving control method for a hybrid vehicle, and more particularly to a technology of implementing backward driving of a hybrid vehicle which is capable of being driven only by a motor.

Description of Related Art

A transmission-mounted-electric-device (TMED)-type hybrid vehicle is configured such that an engine clutch is mounted between an engine and a motor to allow or interrupt power transmission, and the motor is connected to an input shaft of a transmission.

Therefore, in the state in which the engine clutch is disengaged, only the driving force of the motor may be supplied to the driving wheels of a vehicle via the transmission.

The conventional transmission is provided with a backward driving implementation device to implement backward driving using forward rotation force input from the engine. To secure the performance required for backward driving on an uphill road, it is necessary to secure a gear ratio and the capacity of the backward driving implementation device corresponding to the requirements.

For example, in the case of an automatic transmission, a reverse gear stage is implemented using a planetary gear set. Thus, it is impossible to form the transmission such that only the reverse gear stage has a relatively high gear ratio, and thus freedom in design is low. Furthermore, it is necessary to set the specification of the transmission, such as the number of friction members of clutches or brakes for implementing the reverse gear stage or the line pressure of a hydraulic pressure control device, to be relatively high to satisfy the performance required for backward driving on an uphill road.

Because a motor is configured for rotating in the reverse direction thereof, unlike an engine, it is possible for a transmission to implement the reverse gear stage by rotating the motor in the reverse direction without using the backward driving implementation device.

However, in a hybrid vehicle configured for being driven only by a motor, as described above, the capacity of the motor is relatively large, and accordingly the rotational inertia of the motor is relatively large. Thus, when the reverse gear stage is implemented by the reverse rotation of the motor, for example, when the driver performs a shifting to the reverse gear stage during or directly after forward driving, shift responsiveness is lowered.

In particular, in the case in which a shifting to the reverse gear stage is performed during forward driving at a high number of revolutions per minute of the motor, zero-torque control is first performed to decrease the torque of the motor to zero due to the large rotational inertia of the motor, and the rotating direction of the motor is changed, implementing the reverse gear stage. This shift operation has a relatively long response time and thus may cause user dissatisfaction compared to conventional general vehicles.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a backward driving control method for a hybrid vehicle configured for being driven only by a motor, which may satisfy the performance required for backward driving on an uphill road while comparatively lowering the specification of a backward driving implementation device of a transmission, and which may improve responsiveness of shifting to the reverse gear stage, enhancing the marketability of the vehicle.

In accordance with various aspects of the present invention, the above and other objects may be accomplished by the provision of a backward driving control method for a hybrid vehicle, the backward driving control method including a condition determination operation of, when a shifting to a reverse gear stage is performed in a transmission, determining, by a controller, whether the rotation speed of a motor in the forward direction exceeds a predetermined reference speed and whether the torque of the motor exceeds a predetermined reference torque, a first backward driving operation of, when the rotation speed of the motor exceeds the predetermined reference speed and when the torque of the motor exceeds the predetermined reference torque, implementing, by the controller, the reverse gear stage using a backward driving implementation device of the transmission, a zero-torque control operation of, when the rotation speed of the motor exceeds the predetermined reference speed and when the torque of the motor exceeds the predetermined reference torque, decreasing, by the controller, the torque of the motor to zero, a forward driving conversion operation of, when the controller determines that the torque of the motor has decreased to zero, shifting, by the controller, the transmission to a forward gear stage, and a second backward driving operation of, when the forward driving conversion operation is completed, driving, by the controller, the motor in the reverse direction to implement the reverse gear stage.

The transmission may be configured such that a shift is implemented by changing the state of planetary gear sets and shifting from the forward gear stage to the reverse gear stage is implemented by changing friction elements to which hydraulic pressure is supplied, and supply of hydraulic pressure may be diverted from first friction elements used for implementation of the forward gear stage to second friction elements used for implementation of the reverse gear stage in the first backward driving operation.

The controller may simultaneously start the first backward driving operation and the zero-torque control operation.

Upon determining, in the condition determination operation, that the rotation speed of the motor in the forward direction is equal to or less than the predetermined reference speed or that the torque of the motor is equal to or less than the predetermined reference torque, the controller may implement the reverse gear stage by driving the motor in the reverse direction without performing the first backward driving operation.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
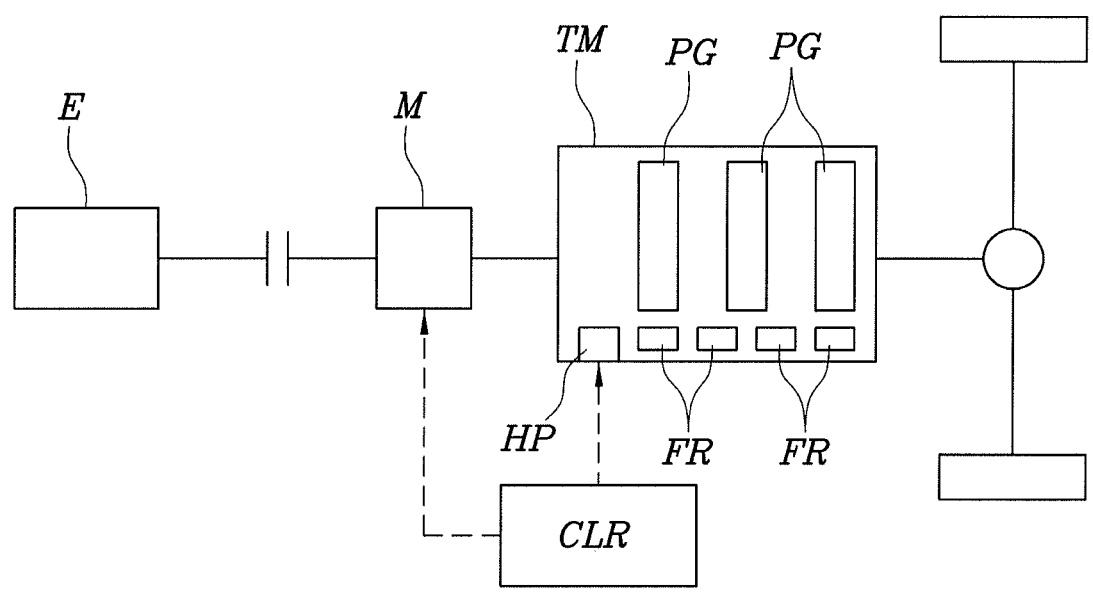
FIG. 1 is a view exemplarily illustrating a powertrain of a hybrid vehicle to which an exemplary embodiment of the present invention which an exemplary embodiment of the present invention is applicable.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Referring to FIG. 1, a powertrain of a hybrid vehicle to which an exemplary embodiment of the present invention is configured to transmit power from an engine E to a transmission TM via an engine clutch EC. A motor M is mounted between the engine clutch EC and the transmission TM, whereby the vehicle is configured for being driven only by the motor M in the state in which the engine clutch EC is disengaged.

A variety of shift mechanisms may be used for the transmission TM. The shift mechanism illustrated in FIG. 1 is similar to that of the conventional automatic transmission. That is, the transmission TM is provided with a plurality of planetary gear sets PG, and the connection state and the rotatable state of rotation elements of the planetary gear sets PG are changed by a plurality of friction elements FR such as clutches or brakes, implementing the shift operation.

The friction elements FR are configured as a wet multi-plate clutch. To drive the friction elements FR, hydraulic pressure needs to be supplied thereto. To the present end, the transmission is provided with a hydraulic pressure control device HP for generating, controlling and supplying hydraulic pressure.

In general, the conventional automatic transmission is configured such that hydraulic pressure to be supplied to the hydraulic pressure control device HP is generated by a mechanical pump, which is linked to the input shaft of the transmission. However, in an exemplary embodiment of the present invention, since the input shaft of the transmission is selectively driven in the reverse direction by the motor depending on the driving situation, the transmission TM is configured such that hydraulic pressure to be supplied to the hydraulic pressure control device HP is generated by a mechanical pump or an electric pump which is configured for being driven bidirectionally.

Although it is illustrated in FIG. 1 that the motor M and the transmission TM are controlled by a controller CLR, the motor M may be controlled by a control device which is separately provided.

Figure 2:
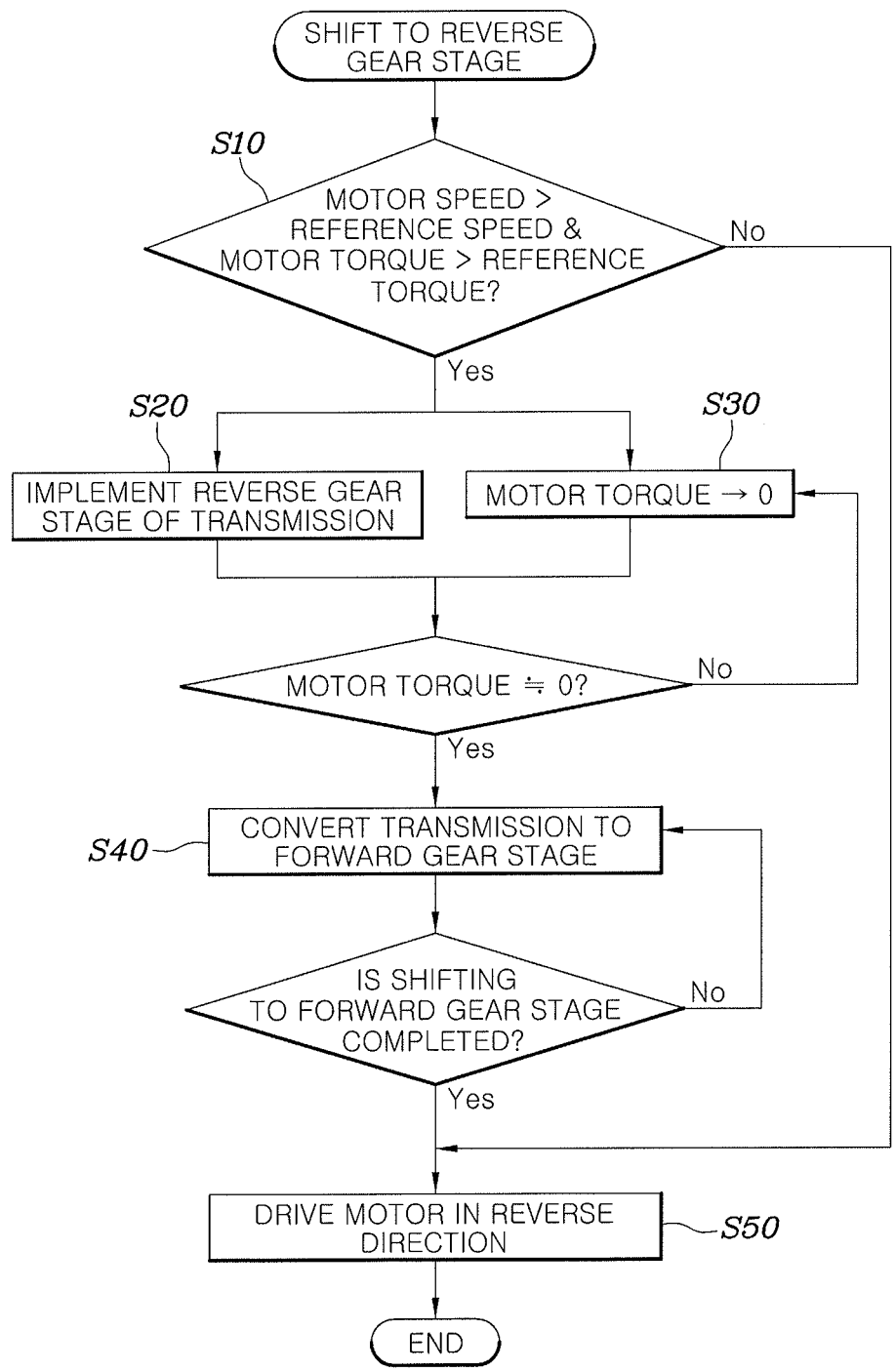
FIG. 2 is a flowchart illustrating a backward driving control method for a hybrid vehicle according to an exemplary embodiment of the present invention.
Figure 3:
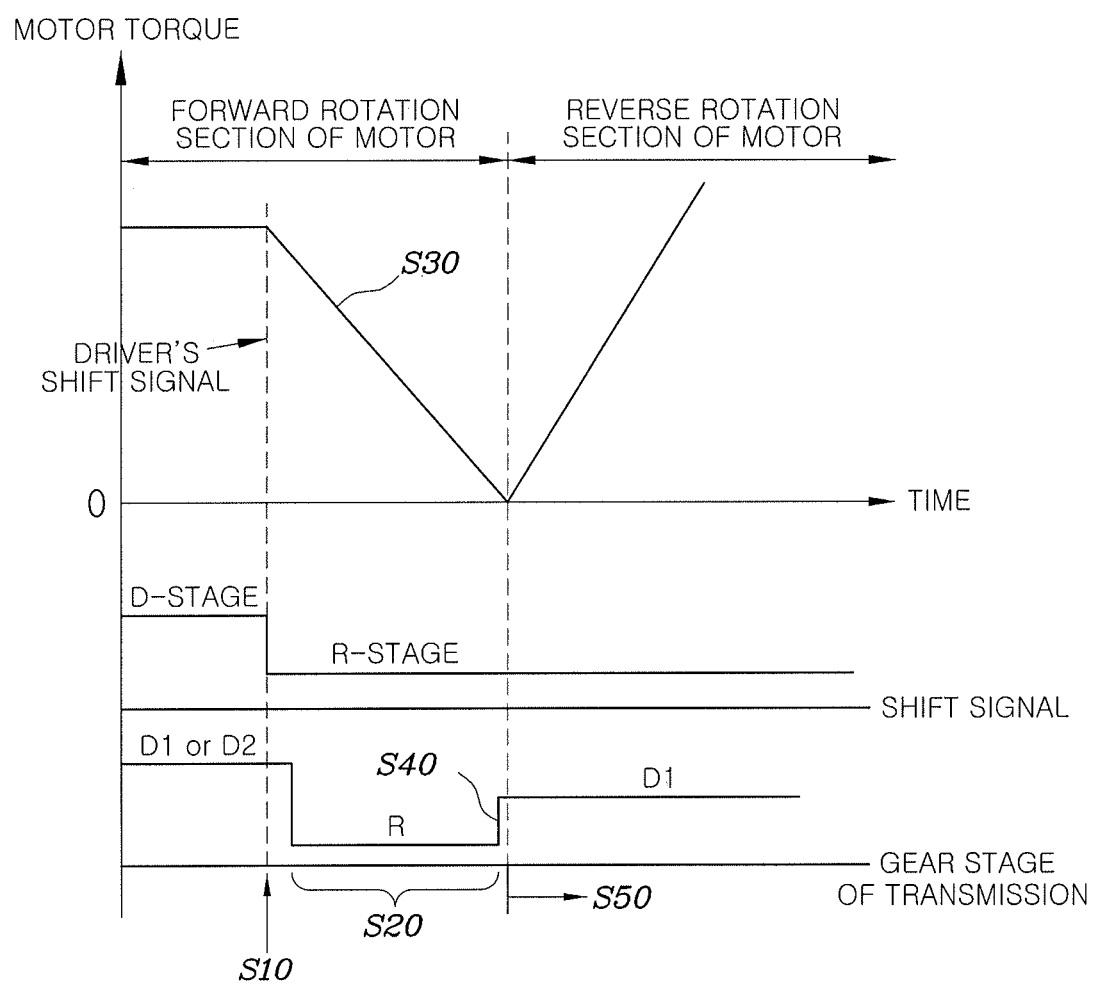
FIG. 3 is a graph illustrating a control process over time according to the backward driving control method for a hybrid vehicle according to the exemplary embodiment of the present invention.

Referring to FIG. 2 and FIG. 3, a backward driving control method for a hybrid vehicle according to an exemplary embodiment of the present invention includes: a condition determination step (S10) of, when the driver performs a shifting to the reverse gear stage, causing the controller CLR to determine whether the rotation speed of the motor M in the forward direction exceeds a predetermined reference speed and whether the torque of the motor M exceeds a predetermined reference torque; a first backward driving step (S20) of, when the rotation speed of the motor M exceeds the predetermined reference speed and when the torque of the motor M exceeds the predetermined reference torque, causing the controller CLR to implement the reverse gear stage using the backward driving implementation device of the transmission; a zero-torque control step (S30) of, when the rotation speed of the motor M exceeds the predetermined reference speed and when the torque of the motor M exceeds the predetermined reference torque, causing the controller CLR to decrease the torque of the motor M to zero; a forward driving conversion step (S40) of, when the controller CLR determines that the torque of the motor M has decreased to zero, causing the controller CLR to shift the transmission to a forward gear stage; and a second backward driving step (S50) of, when the forward driving conversion step is completed, causing the controller CLR to drive the motor M in the reverse direction to implement the reverse gear stage.

That is, the exemplary embodiment of the present invention implements the reverse gear stage through the two steps, namely the first backward driving step (S20) and the second backward driving step (S50), depending on the state of the motor M at the time of shifting to the reverse gear stage by the driver using a shift lever or the like.

Here, the forward direction of the motor M is the same direction as the direction in which the engine rotates. When the forward gear stage of the vehicle is implemented, the motor M is driven in the forward direction thereof, i.e., in the same direction as the engine, and supplies power to the transmission.

The predetermined reference speed and the predetermined reference torque are used to prevent deterioration in the marketability of the vehicle due to low responsiveness caused by the large rotational inertia of the motor M when implementing the reverse gear stage by driving the motor M in the reverse direction after decreasing the torque of the motor M to zero in the state in which the vehicle is traveling forwards until the driver performs a shifting to the reverse gear stage. The predetermined reference speed and the predetermined reference torque are set through multiple experiments and analysis to achieve the above purpose.

As illustrated in FIG. 1, the shifting of the transmission is implemented by changing the state of the planetary gear sets PG and shifting from the forward gear stage to the reverse gear stage is implemented by changing the friction elements FR to which hydraulic pressure is supplied. In the instant case, to implement the reverse gear stage, the supplying of hydraulic pressure is diverted from the friction elements FR used for implementation of the forward gear stage to the friction elements FR used for implementation of the reverse gear stage in the first backward driving step (S20).

It is desirable for the controller CLR to start the zero-torque control step (S30) at the same time as starting the first backward driving step (S20). That is, to secure faster responsiveness to a shifting to the reverse gear stage, it is possible to advance the starting points of the forward driving conversion step (S40) and the second backward driving step (S50) as soon as possible by shifting the transmission to the reverse gear stage through diversion of the supply of hydraulic pressure to the corresponding friction elements FR and, at the same time, by controlling the torque of the motor M to decrease to zero.

When the first backward driving step (S20) and the zero-torque control step (S30) are completed, the forward driving conversion step (S40) is performed to shift the transmission to a forward gear stage. Here, it is desirable to shift the transmission to the first forward gear stage D1 to effectively secure the performance required for backward driving on an uphill road.

The controller CLR rotates the motor M in the reverse direction in the state in which the transmission is maintained in the forward gear stage in the forward driving conversion step (S40), implementing backward driving at the gear ratio of the forward gear stage, in which the transmission is maintained, and consequently securing the performance required for backward driving on an uphill road.

As described above, the first backward driving step (S20) contributes to a shifting to the reverse gear stage only during a time period from the driver's request for backward driving to the decrease of the torque of the motor M to zero. Thus, the backward driving implementation device configured for performing the first backward driving step (S20) does not need to have a level of specification which is configured for completely satisfying the performance required for backward driving on an uphill road. As a result, the gear ratio of the reverse gear stage may be set to be relatively low, and the line pressure and the number of friction members of the friction elements FR may be reduced compared to the transmission of a conventional general vehicle.

Upon determining in the condition determination step (S10) that the rotation speed of the motor M in the forward direction is equal to or less than the predetermined reference speed or that the torque of the motor M is equal to or less than the predetermined reference torque, the controller CLR may immediately drive the motor M in the reverse direction to implement the reverse gear stage without performing the first backward driving step (S20), improving responsiveness of shifting to the reverse gear stage.

As is apparent from the above description, various aspects of the present invention, various aspects of the present invention are directed to providing a backward driving control method for a hybrid vehicle configured for being driven only by a motor, which may satisfy the performance required for backward driving on an uphill road while comparatively lowering the specification of a backward driving implementation device of a transmission, and which may improve responsiveness of shifting to the reverse gear stage, enhancing the marketability of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A backward driving control method for a hybrid vehicle, the backward driving control method including:
   a condition determination operation of, when a shifting to a reverse gear stage is performed in a transmission, determining, by a controller, when a rotation speed of a motor in a forward direction is greater than a predetermined reference speed and when a torque of the motor is greater than a predetermined reference torque;
   a first backward driving operation of, in a response that the rotation speed of the motor is greater than the predetermined reference speed and in a response that the torque of the motor is greater than the predetermined reference torque, implementing, by the controller, the reverse gear stage using a backward driving implementation device of the transmission;
   a zero-torque control operation of, after the first backward driving operation is performed, decreasing, by the controller, the torque of the motor to zero;
   a forward driving conversion operation of, in a response that the controller determines that the torque of the motor has decreased to zero, shifting, by the controller, the transmission to a forward gear stage; and
   a second backward driving operation of, in a response that the forward driving conversion operation is completed, driving, by the controller, the motor in a reverse direction to implement the reverse gear stage.

2. The backward driving control method according to claim 1,
   wherein the shifting of the transmission is implemented by changing a state of planetary gear sets in the transmission and the shifting from the forward gear stage to the reverse gear stage is implemented by changing first friction elements to which hydraulic pressure is supplied, and wherein the supplying of hydraulic pressure is diverted from the first friction elements used for implementation of the forward gear stage to second friction elements used for implementation of the reverse gear stage in the first backward driving operation.

3. The backward driving control method according to claim 1, wherein, upon determining, in the condition determination operation, that the rotation speed of the motor in the forward direction is equal to or less than the predetermined reference speed or that the torque of the motor is equal to or less than the predetermined reference torque, the controller is configured to implement the reverse gear stage by driving the motor in the reverse direction without performing the first backward driving operation.

4. A backward driving control method for a hybrid vehicle, the backward driving control method including:

a condition determination operation of, when a shifting to a reverse gear stage is performed in a transmission, determining, by a controller, when a rotation speed of a motor in a forward direction is greater than a predetermined reference speed and when a torque of the motor is greater than a predetermined reference torque;

a first backward driving operation of, in a response that the rotation speed of the motor is greater than the predetermined reference speed and in a response that the torque of the motor is greater than the predetermined reference torque, implementing, by the controller, the reverse gear stage using a backward driving implementation device of the transmission;

a zero-torque control operation of, at a same time as starting the first backward driving operation, decreasing, by the controller, the torque of the motor to zero;

a forward driving conversion operation of, in a response that the controller determines that the torque of the motor has decreased to zero, shifting, by the controller, the transmission to a forward gear stage; and a second backward driving operation of, in a response that the forward driving conversion operation is completed, driving, by the controller, the motor in a reverse direction to implement the reverse gear stage.

* * * * *